(12) United States Patent
Nagai et al.

(10) Patent No.: US 7,403,460 B2
(45) Date of Patent: *Jul. 22, 2008

(54) INFORMATION RECORDING AND REPRODUCING APPARATUS, EVALUATION METHOD, AND INFORMATION RECORDING AND REPRODUCING MEDIUM

(75) Inventors: Yuji Nagai, Kawasaki (JP); Yutaka Kashihara, Chigasaki (JP); Akihiro Ogawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 46 days.

This patent is subject to a terminal disclaimer.

(21) Appl. No.: 11/501,705

(22) Filed: Aug. 10, 2006

(65) Prior Publication Data

US 2006/0280093 A1    Dec. 14, 2006

Related U.S. Application Data

(63) Continuation of application No. 10/387,134, filed on Mar. 13, 2003, now Pat. No. 7,139,231.

(30) Foreign Application Priority Data

Mar. 13, 2002   (JP)   ............................. 2002-069138

(51) Int. Cl.
    *G11B 20/10*   (2006.01)
(52) U.S. Cl. ................. 369/59.22; 369/124.07
(58) Field of Classification Search ........................ None
    See application file for complete search history.

(56) References Cited

U.S. PATENT DOCUMENTS

| | | | |
|---|---|---|---|
| 5,544,178 A | 8/1996 | Zook | |
| 5,729,517 A | 3/1998 | Fujiwara et al. | |
| 5,793,548 A | 8/1998 | Zook | |
| 5,938,791 A | 8/1999 | Narahara | |
| 6,185,175 B1 | 2/2001 | Zook | |
| 6,940,800 B2 | 9/2005 | Fujimoto et al. | |
| 7,082,566 B2 * | 7/2006 | Kashihara et al. | ........... 714/795 |
| 2002/0178410 A1 | 11/2002 | Haitsma et al. | |
| 2003/0043939 A1* | 3/2003 | Okumura et al. | ............ 375/341 |

OTHER PUBLICATIONS

Tstsuya Okumura et al., A Method for Evaluating PRML System Reliability Using Sequence Amplitude Margin, Technical Digest, international Sysmposium on Optical Memory 2001 (ISOM 01) Japan, p. 272-273.

* cited by examiner

*Primary Examiner*—William Korzuch
*Assistant Examiner*—Tawfik Goma
(74) *Attorney, Agent, or Firm*—Pillsbury Winthrop Shaw Pittman, LLP

(57) ABSTRACT

An evaluation method for calculating an identification signal by using PRML, comprises a table storing true patterns and ideal signals thereof, false patterns corresponding to the true patterns and ideal signals thereof, and Euclidean distance between the true pattern and the false pattern, a calculating unit, when a recording signal synchronized with an identification signal coincides with any pattern of the table, calculates a distance between Euclidean distance between the ideal signal of the true pattern and a reproduction signal and Euclidean distance between the ideal signal of the false pattern and a reproduction signal, and an evaluation unit which evaluates an identification signal by using an average and standard deviation of difference. A table for patterns is created for a likely mistaken pattern, whereby calculating an evaluation value with high precision, of a signal quality, with a small amount of calculation.

5 Claims, 14 Drawing Sheets

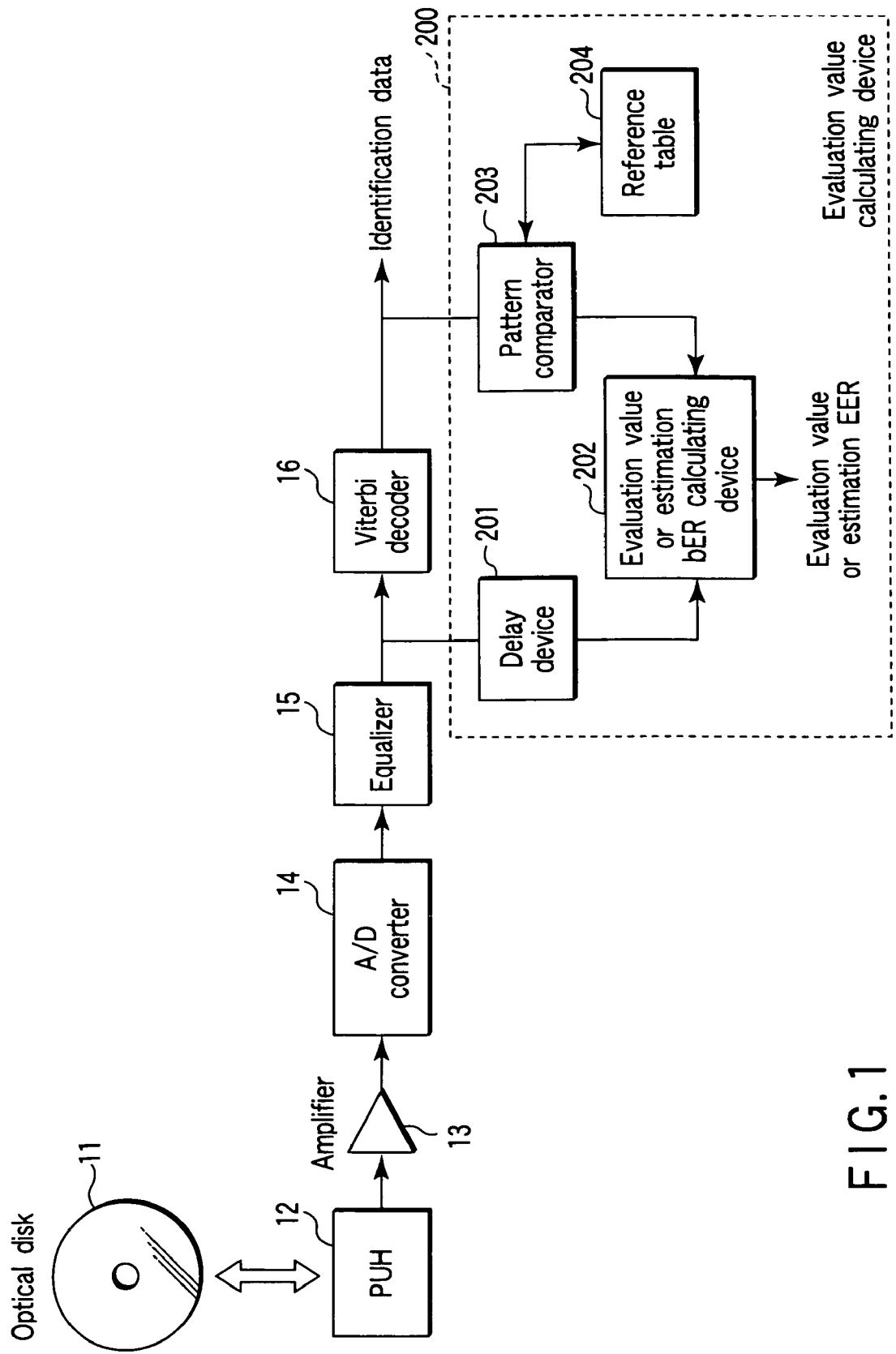
F I G. 1

|  | Pattern A | Ideal signal | Pattern B | Ideal signal | $E^2_{AB}$ | Pattern number |
|---|---|---|---|---|---|---|
| Edge shift | 1111001 | 6 5 3 2 | 1110001 | 5 3 1 1 | 10 | 1 |
|  | 1111000 | 6 5 3 1 | 1110000 | 5 3 1 0 | 10 | 2 |
|  | 1001111 | 2 3 5 6 | 1000111 | 1 1 3 5 | 10 | 3 |
|  | 1001110 | 2 3 5 5 | 1000110 | 1 1 3 4 | 10 | 4 |
|  | 0111001 | 5 5 3 2 | 0110001 | 4 3 1 1 | 10 | 5 |
|  | 0111000 | 5 5 3 1 | 0110000 | 4 3 1 0 | 10 | 6 |
|  | 0001111 | 1 3 5 6 | 0000111 | 0 1 3 5 | 10 | 7 |
|  | 0001110 | 1 3 5 5 | 0000110 | 0 1 3 4 | 10 | 8 |
| 2T shift | 111100111 | 6 5 3 2 3 5 | 111001111 | 5 3 2 3 5 6 | 12 | 9 |
|  | 111100110 | 6 5 3 2 3 4 | 111001110 | 5 3 2 3 5 5 | 12 | 10 |
|  | 100110001 | 2 3 4 3 1 1 | 100011001 | 1 1 3 4 3 2 | 12 | 11 |
|  | 100110000 | 2 3 4 3 1 0 | 100011000 | 1 1 3 4 3 1 | 12 | 12 |
|  | 011100111 | 5 5 3 2 3 5 | 011001111 | 4 3 2 3 5 6 | 12 | 13 |
|  | 011100110 | 5 5 3 2 3 4 | 011001110 | 4 3 2 3 5 5 | 12 | 14 |
|  | 000110001 | 1 3 4 3 1 1 | 000011001 | 0 1 3 4 3 2 | 12 | 15 |
|  | 000110000 | 1 3 4 3 1 0 | 000011000 | 0 1 3 4 3 1 | 12 | 16 |
| 2T shift in telescope manner | 111100111001 | 6 5 3 2 3 4 3 2 | 111001110001 | 5 3 2 3 4 3 1 1 | 14 | 17 |
|  | 111100111000 | 6 5 3 2 3 4 3 1 | 111001110000 | 5 3 2 3 4 3 1 0 | 14 | 18 |
|  | 100110001111 | 2 3 4 3 2 3 5 6 | 100011001111 | 1 1 3 4 3 2 3 5 | 14 | 19 |
|  | 100110001110 | 2 3 4 3 2 3 5 5 | 100011001110 | 1 1 3 4 3 2 3 4 | 14 | 20 |
|  | 011100111001 | 5 5 3 2 3 4 3 2 | 011001110001 | 4 3 2 3 4 3 1 1 | 14 | 21 |
|  | 011100111000 | 5 5 3 2 3 4 3 1 | 011001110000 | 4 3 2 3 4 3 1 0 | 14 | 22 |
|  | 000110001111 | 1 3 4 3 2 3 5 6 | 000011001111 | 0 1 3 4 3 2 3 5 | 14 | 23 |
|  | 000110001110 | 1 3 4 3 2 3 5 5 | 000011001110 | 0 1 3 4 3 2 3 4 | 14 | 24 |

FIG. 3

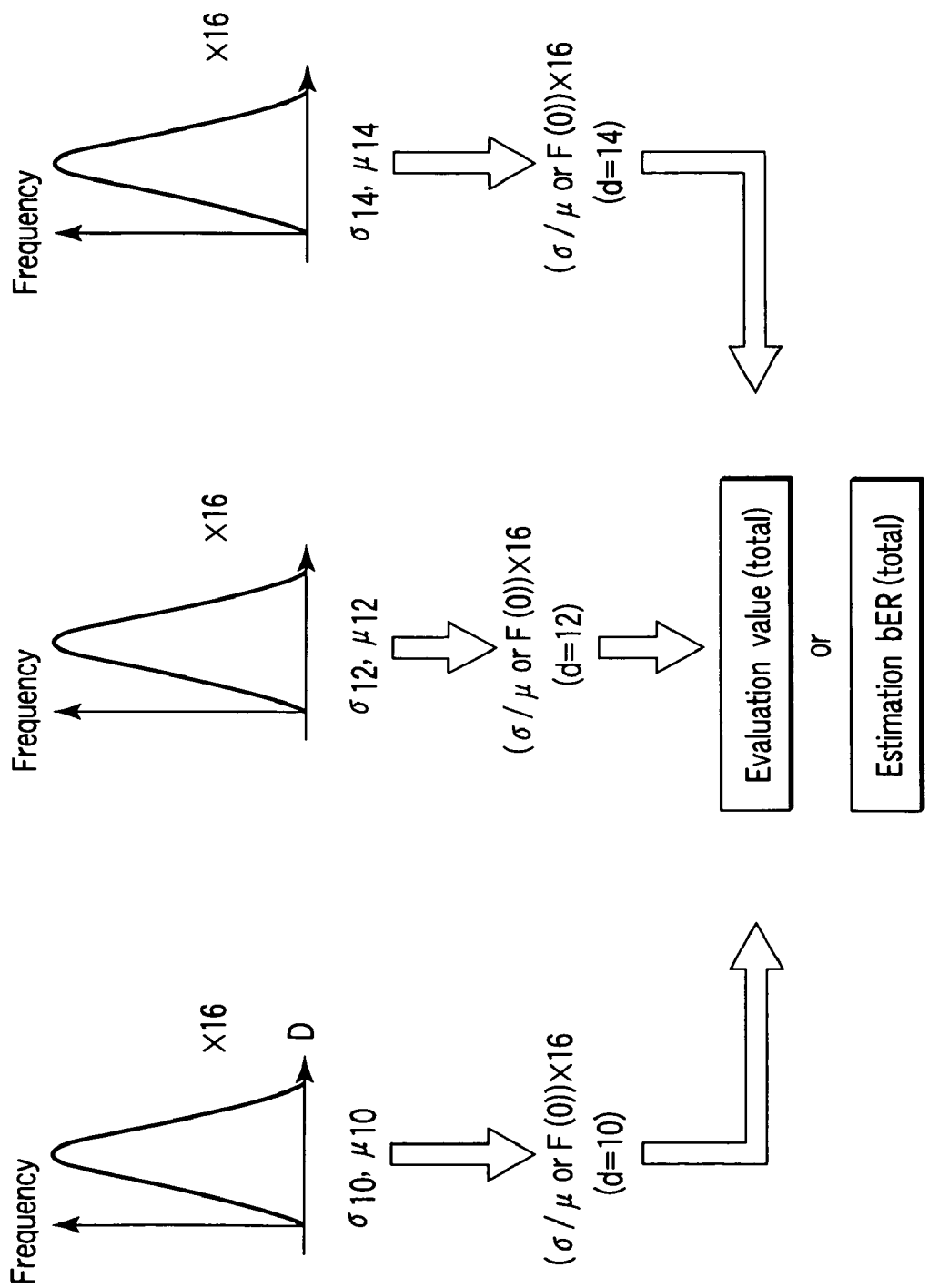
F I G. 8

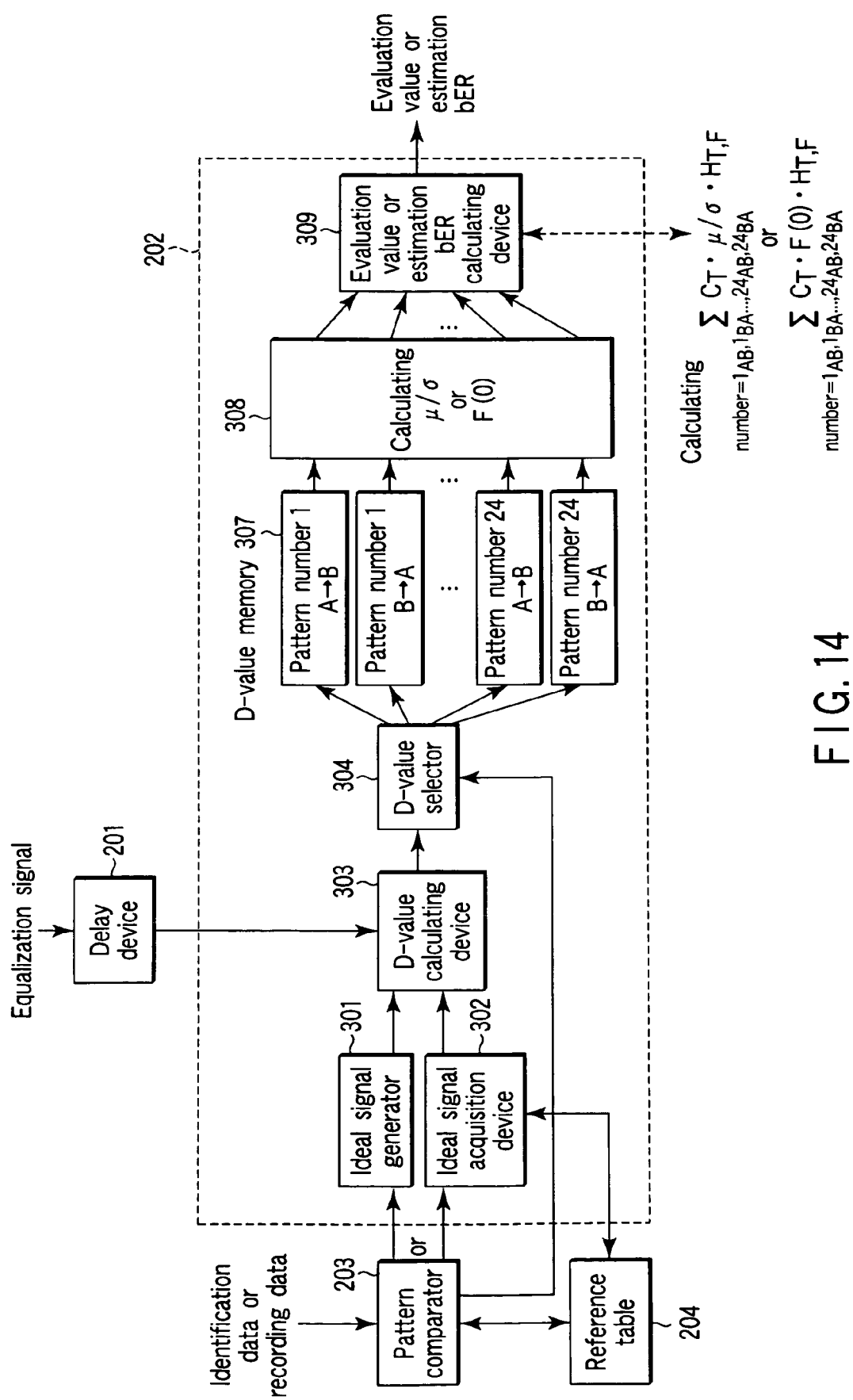
F I G. 14

INFORMATION RECORDING AND REPRODUCING APPARATUS, EVALUATION METHOD, AND INFORMATION RECORDING AND REPRODUCING MEDIUM

CROSS-REFERENCE TO RELATED APPLICATIONS

This application is a continuation of U.S. application Ser. No. 10/387,134, filed Mar. 13, 2003 now U.S Pat. No. 7,139,231, and for which priority is claimed under 35 U.S.C. §120. This application is based upon and claims the benefit of priority under 35 U.S.C. §119 from the prior Japanese Patent Application No. 2002-069138, filed Mar. 13, 2002,the entire contents of both applications are incorporated herein by reference in their entireties.

BACKGROUND OF THE INVENTION

1. Field of the Invention

The present invention relates to an information recording and reproducing apparatus and evaluation method and an information recording medium, and more particularly, to improvement of an information recording and reproducing apparatus and an evaluation method for reproducing a signal recorded in an information recording medium and evaluating the reproduction signal.

2. Description of the Related Art

Signal processing in an information recording and reproducing apparatus includes PRML (Partial Response and Maximum Likelihood) identification scheme. A technique associated with evaluation of a signal quality in a system using the PRML identification scheme includes SAMER (SAM Error Rate) available from Sharp Co., Ltd., disclosure information ISOM' 01 (International Symposium On Optical Memory 2001) Technical Digest P272).

In the PRML identification scheme, the PR (Partial Response) characteristics according to recording and reproducing characteristics are employed. As an example, a description of PR (1, 2, 2, 1) characteristics will be given below. In the case of the PR (1, 2, 2, 1) characteristics, a 4-tap FIR (Finite Impulse Response) filter whose tap coefficient is 1, 2, 2, 1 is employed. When a series of 00010000, for example, is input to the FIR filter, the output is obtained as 00012210. Similarly, when 000110000 is input, 000134310 is output. When 0001110000 is input, 000135531 is output. When 00011110000 is input, 00013565310 is output. These outputs are ideal signals in the bit series. Next, a Viterbi decoder compares an equalized signal output from the filter (equalizer) and an ideal signal with each other, and selects the closest series. A concept of Euclidean distance is introduced. A Euclidean distance $E^2$ indicates a distance between signals, and if signals $S_A$ and $S_B$ are assumed, they are defined as follows.

$$E^2 = \Sigma(S_A - S_B)^2$$

Now, a more specific description will be given by using numerals. Assume that the following reproduction signals $S_1$ and S2 are PR equalized.

$S_1$=[5.9 6.1 5.9 4.9 2.9 0.9 0.1 0.0 0.1]

$S_2$=[5.8 6.0 5.8 4.7 2.7 1.1 0.2 0.1 0.2]

Euclidean distance between the ideal signals of all patterns is calculated in response to the two reproduction signals $S_1$ and S2. As a result of comparing Euclidean distance, assuming that the ideal signal of which Euclidean distance between $S_1$ and S2 is minimal is obtained as [6 6 6 5 3 1 0 0 0] (this is an output of the above FIR filter of [1 1 1 1 1 1 0 0 0 0 0]), and the next minimum ideal signal is obtained [6 6 5 3 1 0 0 0 0] (similarly, an output of [1 1 1 1 1 0 0 0 0 0 0], Euclidean distances respectively are obtained as follows.

With respect to $S_1$ $E_{min}^2 = (6-5.9)^2 + (6-6.1)^2 + (6-5.9)^2 + \ldots + (0-0.1)^2 = 0.08$ $E_{next}^2 = (6-5.9)^2 + (6-6.1)^2 + (6-5.9)^2 + \ldots + (0\times0.1)^2 = 8.88$ With respect to $S_2$ $E_{min}^2 = (6-5.8)^2 + (6-6.0)^2 + (6-5.8)^2 + \ldots + (0-0.2)^2 = 0.36$ $E_{next}^2 = (6-5.8)^2 + (6-6.0)^2 + (6-5.8)^2 + \ldots + (0-0.2)^2 = 7.76$ where $S_1$ is $E_{next}^2 - E_{min}^2 = 8.8$, and $S_2$ is $E_{next}^2 - E_{min}^2 = 7.4$.

As a result, it can be said that $S_1$ is more hardly mistaken than $S_2$ because it is large. In this way, SAM calculating device carries out calculation in accordance with the above described procedures every time a reproduction signal is input from the equalizer. Then, the calculation result of $E^{next2} - E_{min}^2$ is accumulated, and its distribution is calculated, thereby carrying out signal evaluation.

On the other hand, the SAMER calculating device calculates an expected bER (bit error rate) from the SAM distribution. As described above, the SAM distribution is obtained by $E_{next}^2 - E_{min}^2$. Since the Viterbi decoder selects an ideal signal which is the closest to an equalization signal input from an equalizer, a relationship between $E_{next}^2$ and $E_{min}^2$ is always obtained as $E_{next}^2 > E_{min}^2$. However, an identification error occurs in the case where $E_{nest}$ is mistakenly selected instead of $E_{min}$. At this time, a relationship is obtained as $E_{next}^2 < E_{min}^2$ In the SAM distribution, this range is unlikely to be established. However, assuming that a portion of distribution which is lower than "μ" is a normal distribution, the standard deviation "σ" and average "μ" are approximated by Gaussian probability density function, thereby estimating a range of $E_{next}^2 < E_{min}^2$. A problem of SAM and SAMER is, when a group of bit series whose Euclidean distance is minimal is created in response to a bit series, Euclidean distance which is minimal for each group is different from another. Thus, when a distribution of $E_{next}^2 - E_{min}^2$ has been calculated, such distribution is divided in plurality, and is not occasionally obtained as an evaluation value. Further, in the range of "μ" or less of SAMER, there may be a case in which the normality of distribution is destroyed, and there is a possibility that an error occurs between bER estimated at this time and actual bER. In addition, every time a 1-channel reproduction signal is input, the ideal signals of all series and its Euclidean distance are calculated, and a calculation quantity for selecting the minimum value and next minimal value is increased.

BRIEF SUMMARY OF THE INVENTION

The present invention is directed to method and apparatus that substantially obviates one or more of the problems due to limitations and disadvantages of the related art.

According to an embodiment of the present invention, an information recording and reproducing apparatus for calculating an identification signal by using Partial Response and Maximum Likelihood identification scheme, comprises a table which stores true patterns and ideal signals thereof, false patterns corresponding to the true patterns and ideal signals thereof, and Euclidean distance between the true pattern and the false pattern; a calculator which, when the identification signal coincides with any pattern of the table, calculates a difference between Euclidean distance between the ideal signal of the true pattern and a reproduction signal and Euclidean distance between the ideal signal of the false pattern and a reproduction signal; and an evaluation unit configured to evaluate a reproduction signal based on an average and standard deviation in distribution of the difference.

According to another embodiment of the present invention, an information recording and reproducing apparatus for calculating an identification signal by using Partial Response and Maximum Likelihood identification scheme, comprises a table which stores true patterns and ideal signals thereof, false patterns corresponding to the true patterns and ideal signals, and Euclidean distance between the true pattern and the false pattern; a calculator which, when a record signal in synchronism with the identification signal coincides with any pattern of the table, calculates a difference between Euclidean distance between the ideal signal of the true pattern and a reproduction signal and Euclidean distance between the ideal signal of the false pattern and a reproduction signal; and an evaluation unit configured to evaluate a reproduction signal based on an average and standard deviation in distribution of the difference.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of -the embodiments given below, serve to explain the principles of the present invention in which:

FIG. 1 is a block diagram showing an information recording and reproducing apparatus according to a first embodiment of the present invention;

FIG. 3 is a view showing a reference table of the first embodiment;

FIG. 8 is a view showing a third example of calculating an evaluation value of each pattern according to the first embodiment;

FIG. 14 is a block diagram of an evaluation value and an estimated bER calculating device showing a third example of calculating an evaluation value for each pattern according to the first and second embodiments.

DETAILED DESCRIPTION OF THE INVENTION

Figure 2:
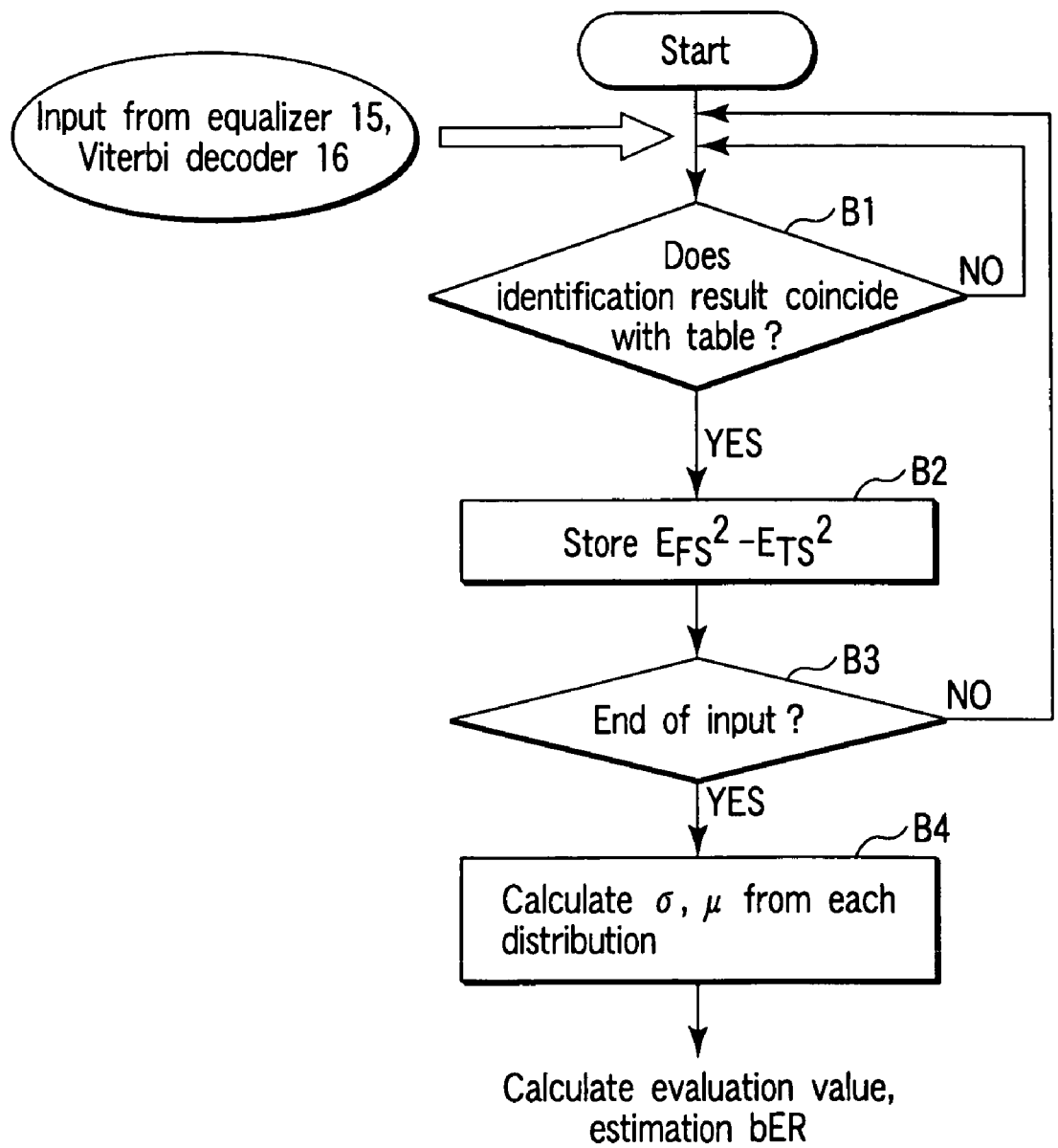
FIG. 2 is a flow chart showing an operation of the first embodiment.

Embodiments of an information recording and reproducing apparatus, a signal evaluating method therefor, and an information recording and reproducing medium according to the present invention will be described with reference to the accompanying drawings.

The present invention will be summarized before specific description of embodiments. Here, in PRML scheme, let us consider a probability that a certain recording pattern T is mistakenly identified as another pattern F. When a reproduction signal is S, and the ideal signals for patterns T and F each are PT and PF, the conditions that pattern T is mistakenly identified as pattern F are as follows.

$$D = E_{F,S}^2 - E_{T,S}^2 < 0 \quad (1)$$

$$E_{1,2} = \sqrt{\sum_i (P1_i - P2_i)^2} \quad (2)$$

In the case where a D value is equal to or greater than 0, pattern T is not mistakenly identified as pattern F. Assuming that a distribution of the accumulated D values (defined by equation (1)) is a normal distribution, and the average and standard deviation each are "$\mu$" and "$\sigma$", the probability that pattern T is mistakenly identified as pattern F is expressed as follows.

$$F(0) = \int_{-\infty}^{0} \frac{\exp\{-(x-\mu)^2/2\sigma^2\}}{\sigma\sqrt{2\pi}} dx \quad (3)$$

F(0) is obtained relevant to patterns T and F with high probability of the occurrence of an error, whereby the evaluation value and bER estimation value are obtained as follows.

Evaluation value = $\Sigma C_T \mu/\sigma \cdot H_{T,F}$ (4)

Estimated bER = $\Sigma C_T F(0) \cdot H_{T,F}$ (5)

where $C_T$ denotes the probability of the occurrence of pattern T, and $H_{T,F}$ denotes Hamming distance between pattern T and pattern F.

Now, a method for selecting patterns T and F will be described here. For the method for selecting patterns T and F, it is effective to use Euclidean distance of equation (2). In general, the probability of the occurrence of error decreases in an exponential function manner in response to an increase of Euclidean distance $E_{T,F}$ between pattern T and pattern F. Therefore, the estimated bER can be obtained from defined patterns in which Euclidean distance $E_{T,F}$ are equal to or smaller than a predetermined value.

First Embodiment

FIG. 1 shows an information recording and reproducing apparatus according to the first embodiment of the present invention. Information recorded as a mark or space in an optical disk 11 is read out as a weak analog signal through an optical head device (PUH) 12. The weak analog signal is amplified to a sufficient level by a preamplifier 13. The amplified analog reproduction signal is converted into a digital reproduction signal by an analog/digital (A/D) converter 14.

The waveform of the digital reproduction signal is equalized according to the PR characteristics to be employed, by an equalizer 15, and the equalized signal is transmitted to a Viterbi decoder 16 and an evaluation value calculating device 200. In the Viterbi decoder 16, the digital reproduction signal is decoded into binary identification data in accordance with Viterbi algorithm. The identification data is transmitted to a rear stage circuit (not shown), is subjected to processing for demodulation or error correction as required, and is supplied to a user.

In addition, the identification data is transmitted to the evaluation value calculating device 200 as well. The evaluation value calculating device 200 calculates an evaluation value by using an output from the equalizer 15 and an output from the Viterbi decoder 16.

The evaluation value calculating device 200 includes a delay device 201, an evaluation value or estimated bER calculating device 202, a pattern comparator 203, and a reference table 204. The delay device 201 is provided as a delay device for time adjusting of an output of the equalizer 15. The pattern comparator 203 compares the identification data that is an output of the Viterbi decoder 16 with each pattern stored in the reference table 204, and supplies the comparison result to the evaluation value or estimated bER calculating device 202. The contents of comparison processing will be described later. When the evaluation value or estimated bER calculating device 202 executes calculation, the calculating device 202 calculates the evaluation value or estimated bER by using a reproduction signal from the delay device 201.

The contents of the reference table 204 may be recorded in a disk (recording medium) and employed by reading out them. In addition, this device itself may generate them automatically.

FIG. 2 shows procedures for calculating an evaluation value. The evaluation value calculating device 200 refers to each pattern of the reference table 204 in response to the identification data input from the Viterbi decoder 16 (step B1). The reference pattern may not be created in advance, and may be automatically generated by the calculating device 200. Pairs of likely mistaken patterns are described in the reference table 204. Pattern A is likely mistaken to pattern B, and vice versa. In accordance with these pairs, pattern A and its ideal signal, pattern B and its ideal signal, and a square of Euclidean distance between patterns A and B (hereinafter, referred to as $E^2_{AB}$) are stored in the reference table 204 (refer to FIG. 3).

Figure 6:
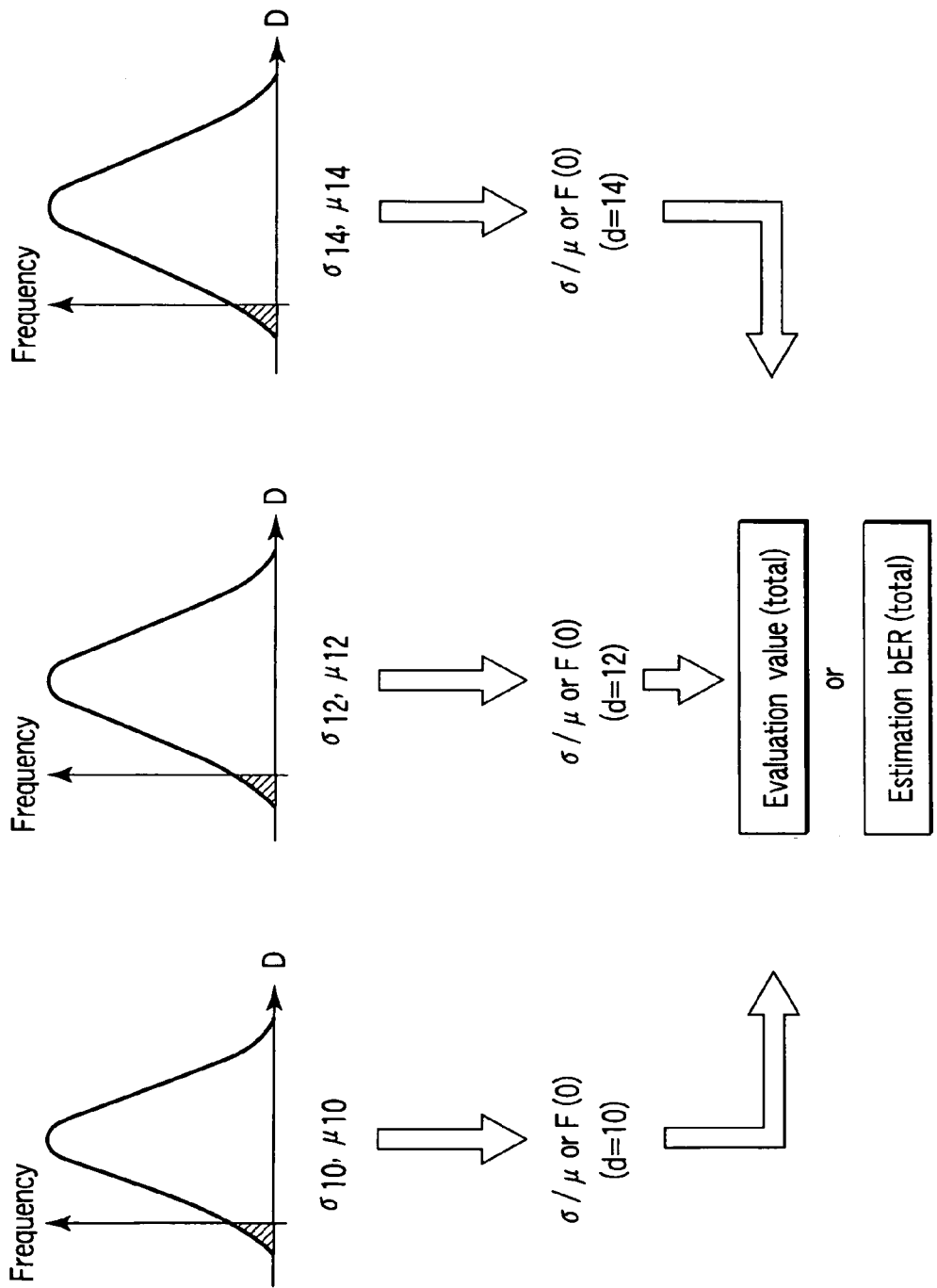
FIG. 6 is a view showing a first example of calculating an evaluation value for each Euclidean distance according to the first embodiment.
Figure 7:
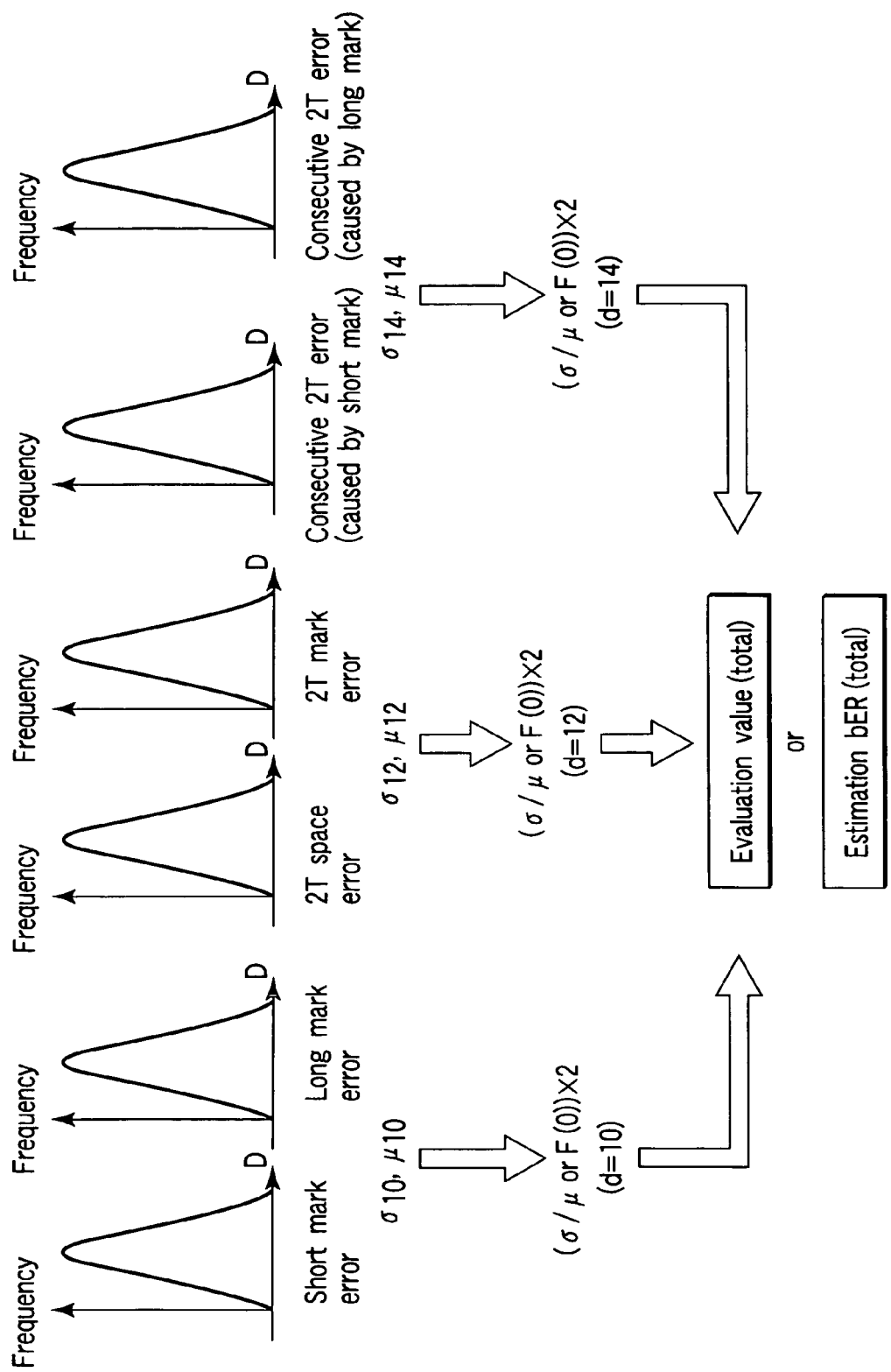
FIG. 7 is a view showing a second example of calculating an evaluation value of each error type according to the first embodiment.

The ideal signal employed here is an FIR filter output of each pattern. The ideal signal can be easily generated from a pattern and vice versa, and thus, either of the pattern and ideal signal may be described in the reference table 204. In response to the input identification data, in the case where the same pattern as this is pattern A or pattern B in the table, it proceeds to calculation of $E_{AS}$, $E_{BS}$. Otherwise, similar processing is carried out relevant to a next input. A pattern coincident with identification data, of patterns A and B, is defined as pattern T, and the other is defined as pattern F. For example, when pattern A coincides with identification data, the result is $D = E^2_{FS} - E^2_{TS} = E^2_{BS} - E^2_{AS}$. In this calculation of $E_{AS}$, $E_{BS}$ ($E_{TS}$, $E_{FT}$), the reproduction signal input from the equalizer 15 is employed. The calculated D values are classified in accordance with a predetermined rule by using a method described later, and are stored in a memory (step B2). FIG. 6, FIG. 7, and FIG. 8 are views each illustrating the above method. A detailed description will be given later. When an input from the equalizer 15 and Viterbi decoder 16 has terminated (step B3), or when data required for calculating the evaluation value and estimated bER has been input, a distribution of the D values stored in the memory is calculated (step B4). The evaluation value and estimated bER are calculated by using the standard deviation "σ" and average "μ" of this distribution. A detailed description of each item will be given below.

(1-1) Method for Creating Pattern Table Using Euclidean Distance

The reference table 204 (referred to in step B1 of FIG. 2) comprises pattern A and its ideal signal, pattern B and its ideal signal, Euclidean distance $E^2_{AB}$ between pattern A and pattern B, and a pattern number. The bit length of pattern A and pattern B change according to the modulation code and PR characteristic. Now, assuming that n code bits 1 is called an nT mark, and n code bits 0 is called an nT space, the bit length changes according to the shortest T and the longest T in each modulation code. In the following embodiment, as an example, when an RLL (1,7) code (RLL: Run-Length Limited) is employed for a modulation code, a series appearing in recording data is obtained as a mark of 2T to 8T and a space. The bit length of the reference table 204 is determined in consideration of this range of Ts. When a pair of pattern A and pattern B is considered, patterns in which the first and last n bits are identical to each other are considered. The value of "n" changes depending on a constrained length "k" of PR characteristics, and n=k−1 is obtained. The constrained length of PR [1221] is 4. Let us consider a pattern in which the first and last n bits are identical to each other. For example, let us consider that the first three bits [011] and the last three bits [010] coincide with each other as in [011101010] relevant to a bit series of [011111010], for example. The minimum Euclidean distance between the pattern A and pattern B in the above condition changes depending on PR characteristics and the modulation code. For example, in the case of PR [1221], RLL (1, 7) code, the minimum Euclidean distance is 10, and is followed by 12, 14, 16, . . . . Of these distances, a pair in which the probability of the occurrence of an error is high is described in the reference table 204. When the number of patterns increases an accurate value can be obtained. However, there is a disadvantage that much processing is required. The number of patterns may be determined according to the required specification. In the present embodiment, PR [1221] and RLL (1, 7) are employed. In this case, it is proper to describe a pattern in which Euclidean distance $E^2_{AB}$ is 10, 12, 14, and thus, a pair having this Euclidean distance is described in the reference table. Specifically, this pair is described as shown in FIG. 3. This reference table 204 is created according to the modulation code and PR characteristics.

With reference to type of error described, there is obtained a pattern in which an identification error is likely to occur in an actual reproduction signal such as shifting of the edge of each T by one bit or by two bits, and shifting of consecutive 2T in a telescope fashion. In the present embodiment, the bit length of the pattern in FIG. 3 is obtained as a variable length for each Euclidean distance. However, the respective bit lengths can be occasionally coincided with each other. In this case, for the bit length of each pattern, a table is created according to the longest bit length. In the present embodiment, a pattern of Euclidean distance $E^2_{AB}=14$ is the longest, and thus, the table is created according to this longest length. Processing is proceeded, serially referring to this table.

(1-2) Calculation of $D = E^2_{FS} - E^2_{TS}$

Figure 5:
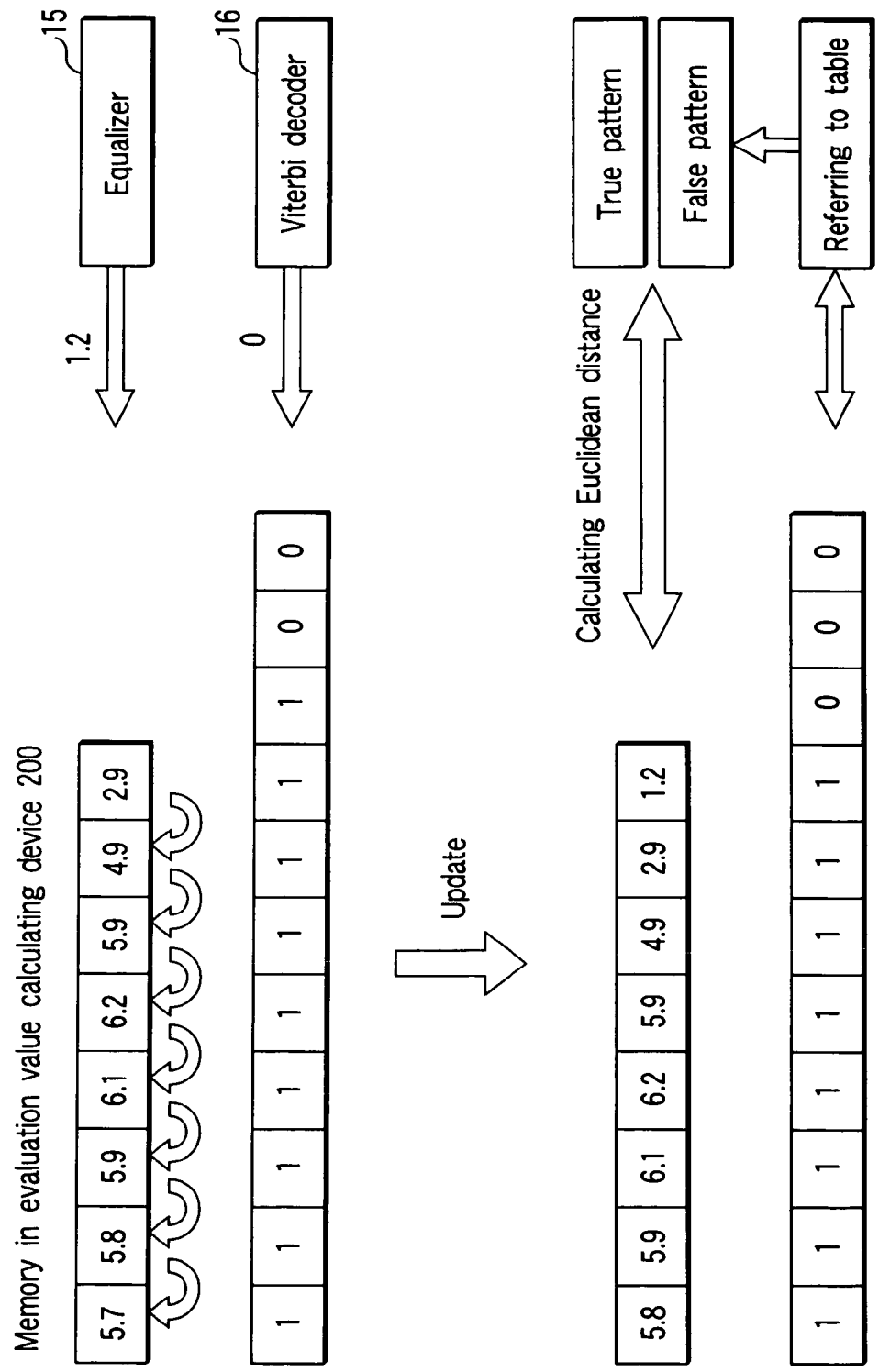
FIG. 5 is a view illustrating a principle of calculating an evaluation value according to the first embodiment.

Calculation of the D value in step B2 of FIG. 2 will be described with reference to FIG. 5. A reproduction signal from the equalizer 15 is input to the evaluation value calculating device 200, and identification data decoded from the Viterbi decoder 16 is input thereto. Input data is accumulated in the memory by the longest bit length in the table. In the present embodiment, the reproduction signal is eight bits in length, and the identification data is 11 bits in length. Every time processing is proceeded, a new reproduction signal and the decoded identification data are added in a memory space. Concurrently, the memory data is shafted by one bit, and updated. Referring to a table in response to this bit series, determination concerning this bit series coincident with pattern A or pattern B is carried out. Now, assuming that the bit series of the identification data input from the Viterbi decoder 16 is [11111111000], the correspondence in the table is an edge shift pattern of 1111000 of pattern number 2 (pattern A), 6531 (ideal signal), 1110000 (pattern B), 5310 (ideal signal), and 10 ($E^2_{AB}$).

When the bit series thus coincides with pattern A or pattern B in the table, Euclidean distance $E_{AS}$ between pattern A and a reproduction signal and Euclidean distance $E_{BS}$ between pattern B and a reproduction signal are calculated, and the D value is calculated.

Figure 4:
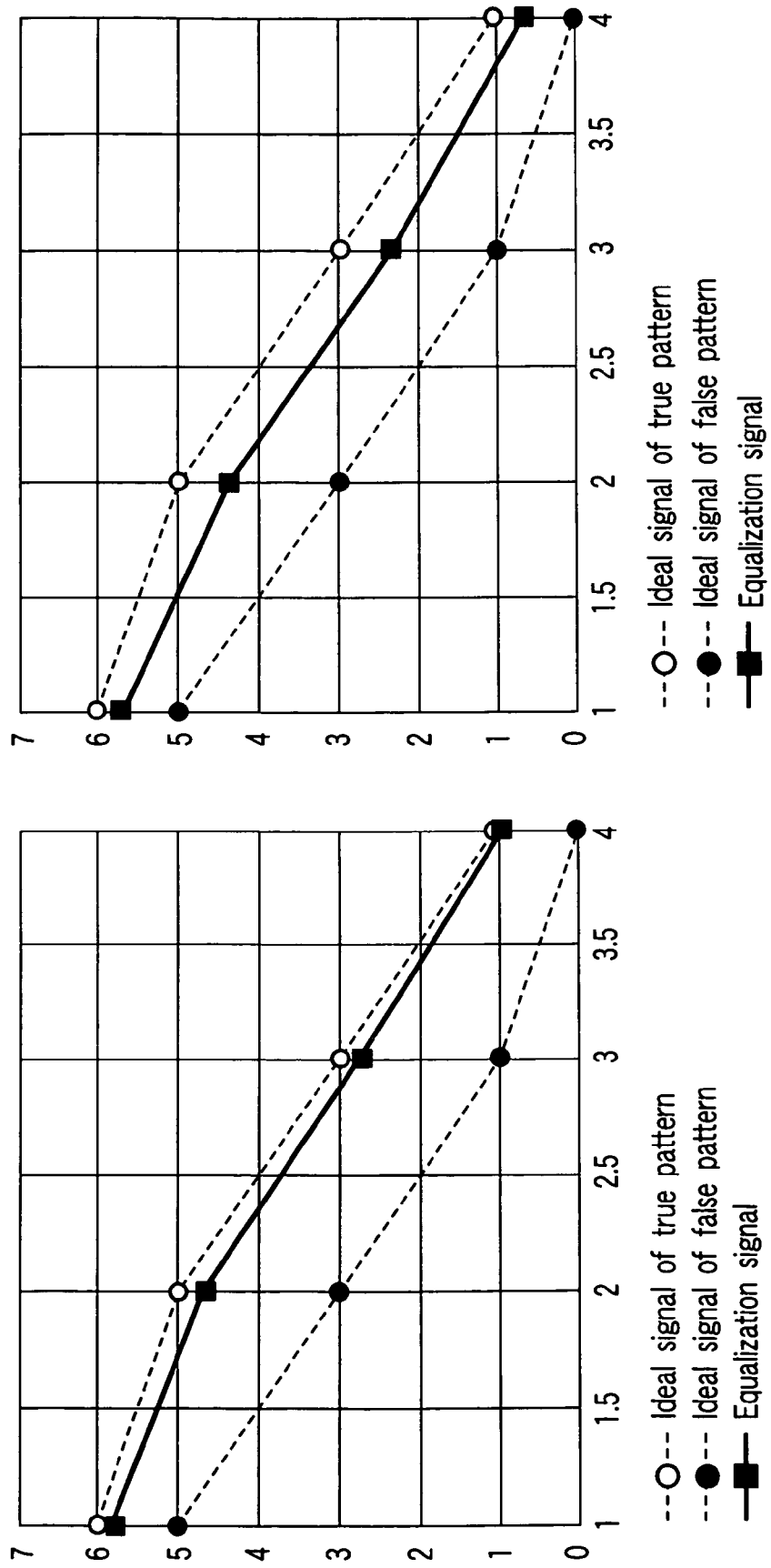
FIGS. 4A and 4B are views showing Euclidean distance between an ideal signal and an equalization signal in response to an acceptable or unacceptable equalization signal.

In the case where an equalization signal is acceptable, the ideal signal of true pattern and equalization signal substantially coincide with each other, as shown in FIG. 4A, and Euclidean distance is close to 0. At this time, a distribution of D values is small in dispersion around $\pm E^2_{AB}$. However, in the case where the equalization signal is unacceptable, there occurs a state in which a distribution of D values is shifted from $E^2_{AB}$, as shown in FIG. 4B, or dispersion increases. The calculated D values are classified by pattern or Euclidean distance (are classified into three types of $E^2_{AB}$=10, 12, and 14 in the present embodiment) in accordance with the evaluation value and estimated bER calculation method, and are stored in the memory. This procedure is carried out until an input from the equalizer 15 and Viterbi decoder 16 has estimated.

(1-3) Calculation of Evaluation Value and Estimated bER

D value calculated for each pattern is classified in accordance with any of the following three methods. And the evaluation value and estimated bER are calculated from "σ" and "μ" of each distribution that comprises each classified D value. (1-3-1) Calculation method by Euclidean distance The D values calculated in (1-2) are classified by Euclidean distance, the respective "σ" and "μ" of distributions are calculated, and the evaluation value and estimated bER are calculated. The distributions classified by Euclidean distance substantially coincide with a normal distribution as shown in FIG. 6. In these distributions, a portion corresponding to an error in accordance with equation (1) is in the range of D<0. Therefore, the distributions are approximated by Gaussian probability density function, and the approximation equation is integrated in the range of D<0, thereby obtaining the occurrence probability by mistaken recognition F(0) for each type of Euclidean distance and μ/σ. Now, there are three types of Euclidean distances (10, 12, 14), and thus, there are three distributions of D values. μ/σ is obtained for calculation of the evaluation value, and F(0) is obtained for calculation of estimated bER by the distributions. The evaluation value is calculated in accordance with equation (4) using these values, and is estimated bER is calculated in accordance with equation (5). A reason why classification is carried out by Euclidean distance is that Hamming distances (distances between codes) are different from each other. Specifically, in the case where Euclidean distance "d" is 10, Hamming distance is 1 relevant to a pattern in which 0000111 is mistakenly identified as 0001111, for example. In the case where Euclidean distance "d" is 12, Hamming distance is 2 relevant to a pattern in which 000011000 is mistakenly identified as 000110000, for example. In the case where Euclidean distance "d" is 14, Hamming distance is 3 relevant to a pattern in which 00001100111 is mistakenly identified as 00011001111, for example. As in the following calculation method, Gaussian probability density function is a nonlinear function, thus making it necessary to classify the distribution of D values in accordance with Hamming distance. In addition, $C_T$ n Formulas (4) and (5) is determined in accordance with PR characteristics and the modulation code. This is because the probability of the occurrence of each pattern in recording data is different depending on PR characteristics and the modulation code. The thus determined coefficients $C_T$, $H_{T,F}$ may be calculated by a calculating device every time or may be stored in advance in the memory.

Figure 12:
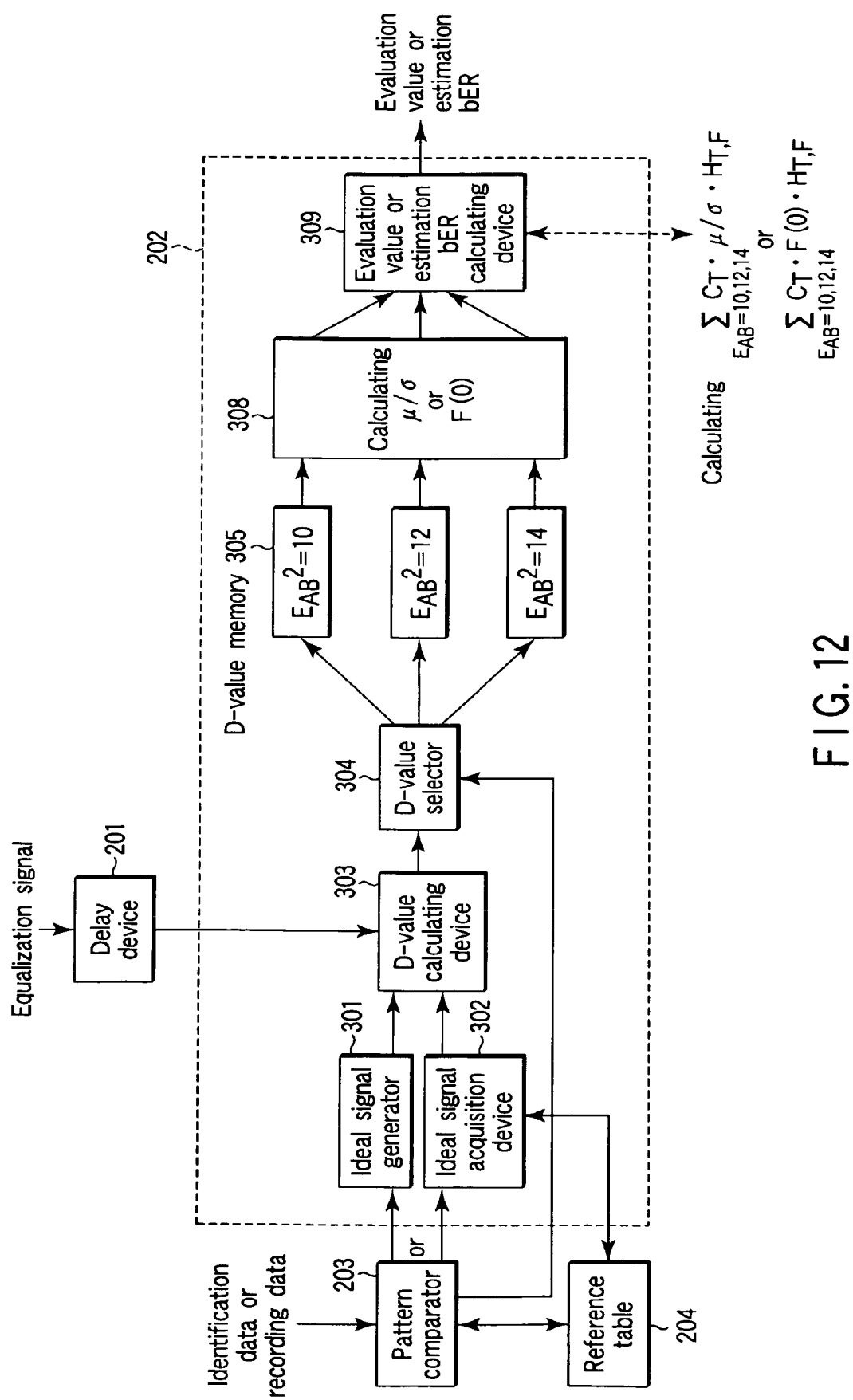
FIG. 12 is a block diagram of an evaluation value and an estimated bER calculating device showing a first example of calculating an evaluation value for each Euclidean distance according to the first and second embodiments.

FIG. 12 is a block diagram depicting a flow of the above estimated bER calculation method in (1-3-1). In response to the identification data input from the Viterbi decoder 16, first, the pattern comparator 203 compares identification data with the reference table 204. When there is a pattern (A or B) coincident with identification data in the reference table 204, an ideal signal generator 301 generates an ideal signal of the pattern, or an ideal signal acquisition device 302 acquires an ideal signal in the reference table 204. A D-value calculating device 303 calculates a D value from the reproduction signal (equalization signal) and its ideal signal input from the equalizer via the delay device 201. The calculated D value is stored in a D-value memory 305 by $E_{AB}^2$ (10 or 12 or 14) in the pattern in the reference table coincident with the identification, by means of a D-value selector 304. When the number of samples in each D-value memory 305 is sufficient, a calculating device 308 obtains each μ/σ and the probability of the occurrence by mistaken recognition F(0) for each type of Euclidean distance shown in equation (3). A calculating device 309 calculates a total of these values, an evaluation value, or estimated bER.

(1-3-2) Calculation Method by Error Type

The D values calculated in (1-2) are classified by error type, "σ" and "μ" of each distribution is calculated, and the evaluation value and estimated bER is calculated. The distributions classified for error types each coincide with a normal distribution as shown in FIG. 7. Now, a description of error types will be described here. In the case where Euclidean distance "d" is 10 or 14, if pattern A is mistakenly identified as pattern B as shown in FIG. 3, an error that a mark edge decreases occurs. Otherwise, an error that the mark edge increases occurs. In the case where an offset occurs with a signal, a distribution of $D = E^2_{FS} - E^2_{TS} = E^2_{BS} 31 E^2_{AS}$ is different from $D = E^2_{FS} - E^2_{TS} = E^2_{AS} - E^2_{BS}$ in center. In this case, the normality of distribution is degraded. Therefore, in this case, the D values whose $E^2_{AS}$ are 10 and 14 are classified into $D = E^2_{FS} - E^2_{TS} = E^2_{BS} - E^2_{AS}$ and $D = E^2_{FS} - E^2_{TS} = E^2_{AS} - E^2_{BS}$, respectively, as shown in FIG. 7, and a total of four distributions are obtained. In addition, in the case of a pattern in which $E^2_{AB}$ is 12, such a pattern is associated with a 2T shift error as shown in FIG. 3. However, as shown in FIG. 7, these patterns can be classified as those of a 2T mark and those of a 2T space. Specifically, pattern numbers 11, 12, 15, and 16 are associated with the 2T mark, and the pattern numbers 9, 10, 13, and 14 are associated with the 2T space. If asymmetry with a reproduction signal, the distributions of 2T mark and 2T space are different from each other in center. In this case, the normality of distribution is degraded. Therefore, the D value is classified into a pattern of 2T mark and a pattern of 2T space, which provides two distributions. In the present embodiment, $E^2_{AB}$ has three types of 10, 12, and 14, and thus, a total of six "σ" and "μ" are calculated. The method for calculating the evaluation value and estimated bER is identical to that described in (1-3-1).

Figure 13:
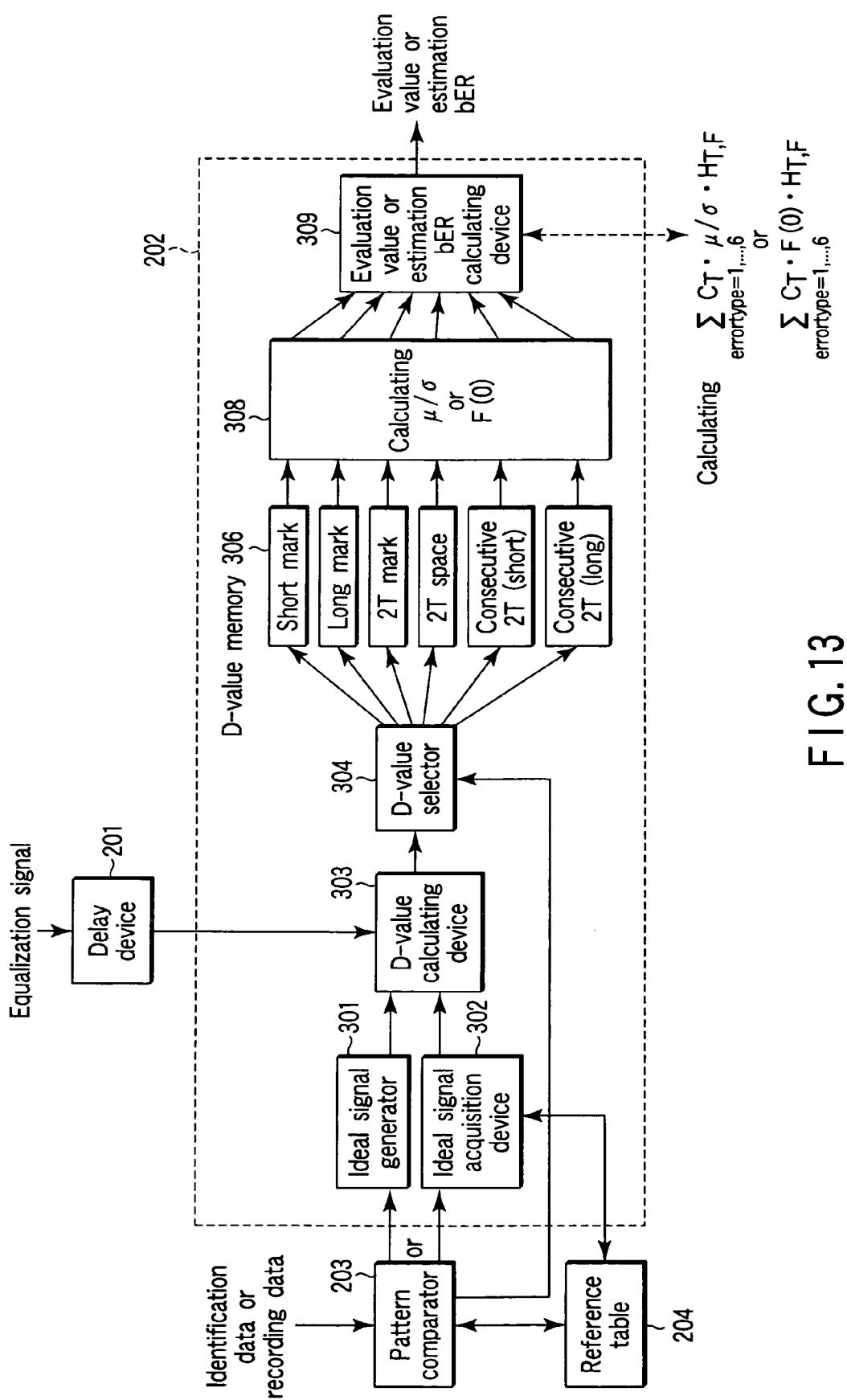
FIG. 13 is a block diagram of an evaluation value and an estimated bER calculating device showing a second example of calculating an evaluation value for each error type according to the first and second embodiments.

FIG. 13 is a block diagram depicting a flow of the above estimated bER calculation method in (1-3-2). In response to the identification data input from the Viterbi decoder 16, first, the pattern comparator 203 compares identification data with the reference table 204. When there is a pattern (A or B) coincident with identification data in the reference table 204, the ideal signal generator 301 generates an ideal signal of this pattern, or the ideal signal acquisition device 302 acquires an ideal signal in the reference table 204. The D-value calculating device 303 calculates a D value from the reproduction signal (equalization signal) and the ideal signal input from the equalizer via the delay device 201. The calculated D values are stored in D-value memories 306 by type of error in the pattern in the reference table coincident with identification data (a short mark error, a long mark error, 2T space error, 2T mark error, consecutive 2T error (caused by short mark)). In the case where the number of samples in each D-value memory 306 is insufficient, the calculating device 308 obtains each μ/σ and the probability of the occurrence by mistaken recognition F(0) for each type of Euclidean distance shown in equation (3). The calculating device 309 calculates a total of these values and an evaluation value or estimated bER.

(1-3-3) Calculation Method by each Pattern

The D values calculated in (1-2) are classified by each pattern, and the evaluation value and estimated bER are calculated based on a distribution thereof. The D values are classified as those of which pattern A is mistakenly identified as pattern B and those of which pattern B is mistakenly identified as pattern A. In the present embodiment, a total number of patterns is 24. Each distribution is a normal distribution as shown in FIG. 8. In the present embodiment, a total number of patterns is 24, and thus, a total of 48 "σ" and "μ" are calculated. The method for calculating the evaluation values and estimated bER each is identical to that in (1-3-1).

FIG. 14 is a block diagram depicting a flow of the above estimated bER calculation method in (1-3-3). In response to the identification data input from the Viterbi decoder 16, first, the pattern comparator 203 compares the identification data with the reference table 204. In the case where there is a pattern (A or B) coincident with the identification data in the reference table 204, the ideal signal generator 301 generates an ideal signal of the pattern, or the ideal signal acquisition device 302 acquires an ideal signal in the reference table 204. The D-value calculating device 303 calculates D values from the reproduction signal (equalization signal) and ideal signal input from the equalizer 15 via the delay device 201. The calculated D values are stored in D-value memories 307 by pattern in the reference table 204 coincident with the identification data (where pattern A of pattern number 1 is mistakenly identified as pattern B, where pattern B of pattern number 1 is mistakenly identified as pattern A, or where pattern A of pattern number 2 is mistakenly identified as pattern B, . . . ). When the number of samples in each D-value memory 307 is sufficient, the calculating device 308 obtains each μ/σ and the probability of the occurrence by mistaken identification F(0) by type of Euclidean distance shown in equation (3). The calculating device 309 calculates a total of these values and the evaluation value or estimated bER.

As this evaluation value, for example, a value of $10^{-3}$ or less is realistic.

Although the above embodiment has been described by using PR (1, 2, 2, 1), the present embodiment can be applied even by using the other PR characteristics. Although the present embodiment has been described by using an RLL (1, 7) code, the present embodiment can be applied even by using the other modulation code.

As has been described above, according to the first embodiment, a pattern table is created for a likely mistaken pattern, whereby the evaluation value and estimated bER can be calculated with a small amount of calculation. In addition, a distribution is calculated for each pattern, the evaluation value and estimated bER with high precision can be calculated from a distribution with good normality. In a conventional SAMER technique, if a group of bit series whose Euclidean distance is minimal is created for a predetermined bit series, Euclidean distance which is minimal for each group is different from another. Thus, when a distribution of $E^{next2} - E_{min}^2$ has been calculated, such a distribution is divided into a plurality of distributions, and is not obtained as an evaluation value. In addition, in a SAMER technique, a case in which normality is destroyed in the range of the average value of g or less is considered. There is a possibility that an error occurs between bER estimated at this time and actual bER. Further, in the SAMER technique, every time a 1-channel reproduction signal is input, the ideal signal of all series and its Euclidean distance are calculated, and the minimum value and a next minimum value are selected. Thus, a calculation quantity increases.

Hereinafter, an information recording and reproducing apparatus, a signal evaluation method therefor, and an insulation recording and reproducing medium will be described according to other embodiments of the present invention. In the description of such another embodiment, similar elements according to the first embodiment are designated by the same reference numerals. A detailed description thereof is omitted here.

Second Embodiment

Figure 9:
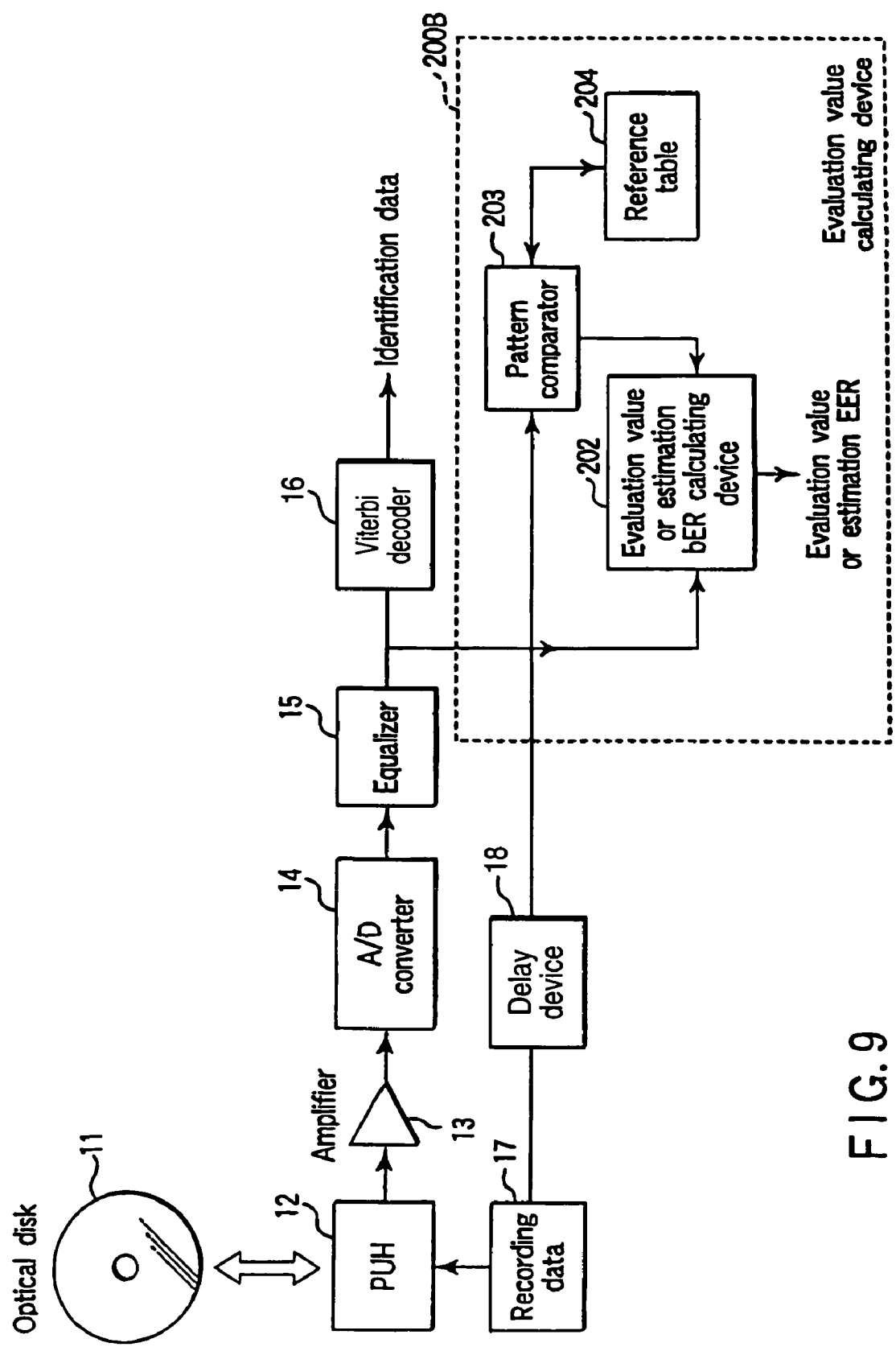
FIG. 9 is a block diagram showing an information recording and reproducing apparatus according to a second embodiment of the present invention.

FIG. 9 shows a configuration of the second embodiment. Information recorded as a mark or space in the optical disk 11 is read out as a weak analog signal through the PHU 12. The weak analog signal is amplified to a sufficient level by the preamplifier 13. The amplified analog reproduction signal is converted into a digital reproduction signal by the A/D converter 14. A waveform of the digital reproduction signal is equalized according to the PR characteristics to be employed by the equalizer 15. The equalized signal is transmitted to the Viterbi decoder 16 and an evaluation value calculating device 200B. The decoded identification data is transmitted to a rear stage circuit (not shown), is subjected to processing for demodulation or error correction and the like is carried out as required, and is supplied to a user.

The evaluation value calculating device 200B calculates an evaluation value by using an output from the equalizer 15 and recording data synchronized with this output (via the delay device 18). The evaluation value calculating device 200B includes the evaluation value or estimated bER calculating device 202, pattern comparator 203, and reference table 204. The delay device 18 is provided as a delay device for supplying the recording data 17 to the evaluation value calculating device 200B in synchronism with the output of the equalizer 15. The pattern comparator 203 compares the recording data 17 via the delay device with each pattern stored in the reference table 204, and supplies the comparison result to the evaluation value or estimated bER calculating device 202. The contents of comparison processing will be described later. The evaluation value or estimated bER calculating device 202 calculates an evaluation value by using a reproduction signal from the delay device 201.

Figure 10:
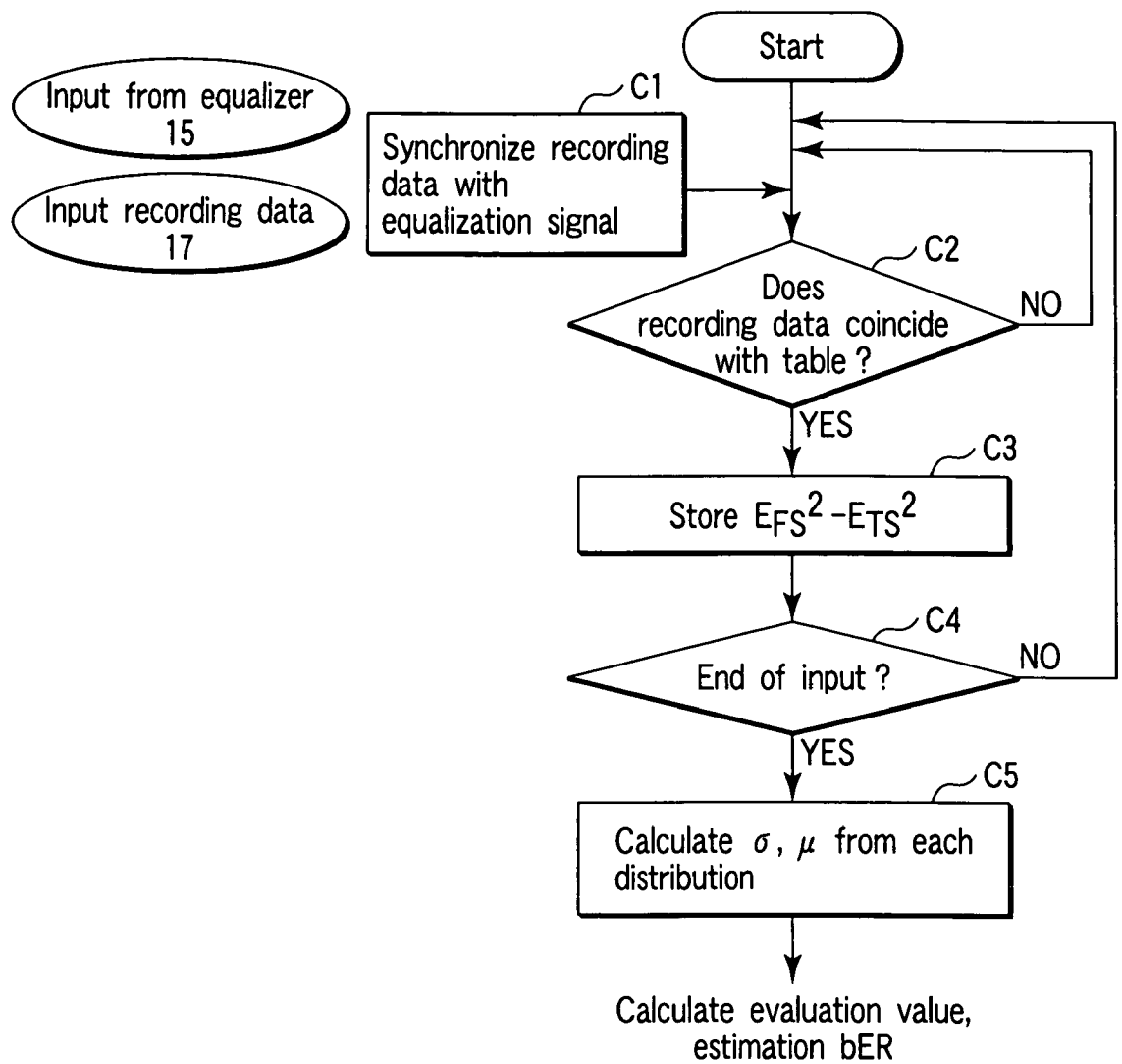
FIG. 10 is a flow chart showing an operation of the second embodiment.

FIG. 10 shows procedures for calculating an evaluation value. The evaluation value calculating device 200B executes synchronization between the equalization signal input from the equalizer 15 and the recording data 17 (step C1). At a time when they are synchronized with each other, the evaluation value or estimated bER calculating device 202 refers to the reference table 204 created in advance or automatically generated by the calculating device 202 (step C2). In response to the input recording data, in the case where the same pattern to the data corresponds to pattern A or pattern B in the table, calculation of $E_{AS}$, $E_{BS}$ is proceeded. Otherwise, similar processing is carried out relevant to next input. At this time, a pattern coincident with the recording data, of patterns A and B, is defined as pattern T, and the other is defined as pattern F. For example, in the case where pattern A coincides with recording data, $D=E^2_{FS}-E^2_{TS}=E^2_{BS}-E^2_{AS}$ is obtained. In this calculation of $E_{AS}$, $E_{BS}$ ($E_{TS}$, $E_{FS}$), the reproduction signal input from the equalizer 15 is employed.

The calculated D values are classified by the calculation methods described previously according to a predetermined rule, respectively, and stored in the memories (step C3). FIG. 6, FIG. 7, and FIG. 8 are views illustrating the respective methods. When an input from the equalizer 15 has terminated (step C4), or when data required for calculating the evaluation value or estimated bER has been input, a distribution of the D values each stored in the memories is calculated (step C5). The evaluation value and estimated bER are calculated by using a standard deviation "σ" and average "μ" of this distribution.

(2-1) Method for Creating Pattern Table Using Euclidean Distance

The reference table 204 (referred to in step C2 of FIG. 10) creates a likely mistaken pattern according to the modulation code and PR characteristics by using Euclidean distance in the same way as that in the first embodiment. The contents of the reference table 204 may be recorded in a disk (recording medium) and used by reading them out. In addition, the device itself may generate them automatically.

(2-2) Calculation of $D = E^2_{FS} - E^2_{TS}$

Figure 11:
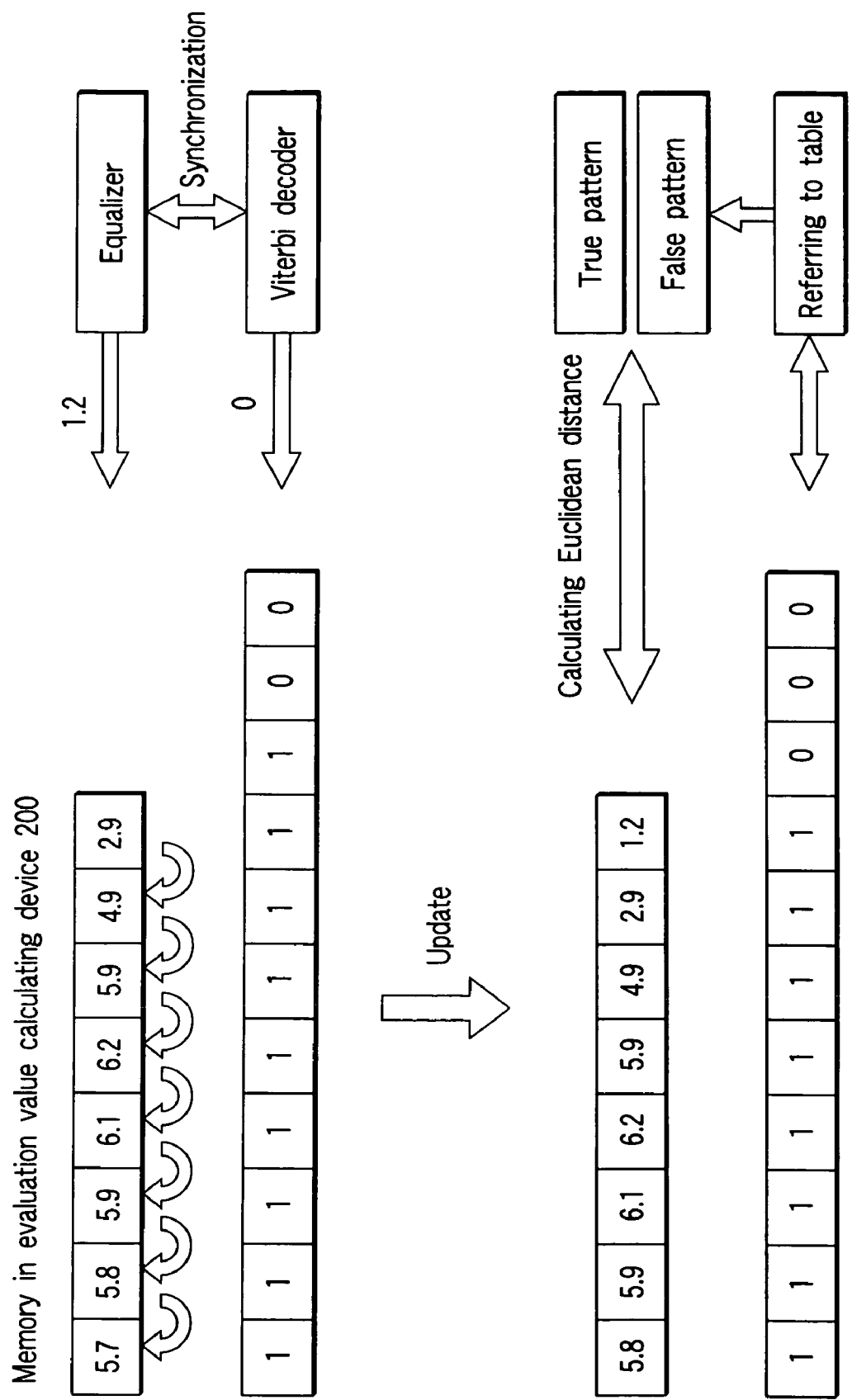
FIG. 11 is a view illustrating a principle of calculating an evaluation value according to the first embodiment.

Calculation of the D value in step C3 of FIG. 10 will be described with reference to FIG. 11. A reproduction signal from the equalizer 15 is input to the evaluation value or estimated bER calculating device 202, and the recording data 17 synchronized with the equalization signal is input thereto. Input data is accumulated in the memory by the longest bit length in the table. In the present embodiment, the reproduction signal is eight bits in length, and the recording data is 11 bits in length. Every time processing is proceeded, a new reproduction signal and the recording data synchronized with the identification data are added in a memory space. Concurrently, the memory data is shifted by one bit, and updated. Referring to a table in response to this bit series, determination concerning all patterns coincident with pattern A or pattern B is carried out. Now, assuming that the bit series of the identification data input from the Viterbi decoder 16 is [11111111000], the correspondence in the table is an edge shift pattern of 1111000 of pattern number 2 (pattern A), 6531 (ideal signal), 1110000 (pattern B), 5310 (ideal signal), and 10 ($E^2_{AB}$). The patterns described in the table are different from each other in bit length for each Euclidean distance $E2_{AB}$. When the bit length of each pattern coincides with the bit series in the memory, detection is carried out in the same manner. When the bit series thus coincides with pattern A or pattern B in the table, Euclidean distance $E_{AS}$ between pattern A and a reproduction signal and Euclidean distance $E_{BS}$ between pattern B and a reproduction signal are calculated, and the D value is calculated. The calculated D values are classified by pattern or Euclidean distance (are classified into three types of $E^2_{AB}$=10, 12, and 14 in the present embodiment) in accordance with the same method for calculating evaluation value and estimated bER as that in the first embodiment, and are stored in the memory. This procedure is carried out until inputs from the equalizer 15 has terminated.

(2-3) Calculation of evaluation value and estimated bER D value calculated for each pattern is classified in accordance with any of the same three methods as those in the first embodiment and the evaluation value and estimated bER are calculated. As has been described above, according to the second embodiment as well, a pattern table is created in advance for a likely mistaken pattern, whereby the evaluation value and estimated bER can be calculated in small amount of calculation. In addition, a distribution is calculated for each pattern, whereby the evaluation value and estimated bER with high precision can be calculated from a distribution with good normality.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein. For example, the present invention can be practiced as a computer readable recording medium in which a program for allowing the computer to function as predetermined means, allowing the computer to realize a predetermined function, or allowing the computer to conduct predetermined means.

What is claimed is:

1. An information reproducing apparatus for detecting data recorded in a medium by Partial Response and Maximum Likelihood signal processing units and an equalizer, the apparatus comprising:

a table which stores plural pairs of a true pattern and a false pattern;

a pattern comparator which compares the detected data with the true patterns and the false patterns stored in the table to find a pair of the true pattern and the false pattern one of which pattern coincides with the detected data; and a calculating device which, when the pattern comparator finds the pair, calculates:

a first Euclidean distance $E^2_{F,S}$ between an output signal of the equalizer and an ideal signal of the false pattern included in the detected pair, a second Euclidean distance $E^2_{T,S}$ between an output signal of the equalizer and an ideal signal of the true pattern included in the detected pair, a difference between the first Euclidean distance and the second Euclidean distance, and an average (μ) and a standard deviation (σ) of a distribution of the difference, wherein the detected data is evaluated based on $$F(0) = \int_{-\infty}^{0} \frac{\exp\{-(x-\mu)^2/2\sigma^2\}}{\sigma\sqrt{2\pi}} dx$$

where F(0) denotes a probability of occurrence by mistaken identification from a true pattern to a false pattern.

2. An information reproducing apparatus for detecting data-recorded in a medium by Partial Response and Maximum Likelihood signal processing units and an equalizer, the apparatus comprising:

a table which stores plural pairs of a true pattern and a false pattern;

a pattern comparator which compares the detected data with the true patterns and the false patterns stored in the table to find a pair of the true pattern and the false pattern one of which pattern coincides with the detected data; and a calculating device which, when the pattern comparator finds the pair, calculates;

a first Euclidean distance ($E^2_{F,S}$) between an output signal of the equalizer and an ideal signal of the false pattern included in the pair, a second Euclidean distance ($E^2_{T,S}$) between an output signal of the equalizer and an ideal signal of the true pattern included in the detector pair, a difference between the first Euclidean distance and the second Euclidean distance, an average ($\mu$) and a standard deviation ($\sigma$) of a distribution of the difference, wherein the detected data is evaluated based on an evaluation value=$\Sigma C_{T,\mu/\sigma} \cdot H_{T,F}$.

where $C_T$ denotes a probability of occurrence of a true pattern T, $H_{T,F}$ denotes Hamming distance between the pattern T and a false pattern F.

3. A method of analyzing data recorded in a medium, comprising:

storing plural pairs of a true pattern and a false pattern;

comparing recording data which is in synchronism with data detected from the medium with stored true patterns and stored false patterns to detect a pair of the true pattern and the false pattern one of which pattern coincides with the recording data; and upon finding the pair, calculating (a) a first Euclidean distance ($E^2_{F,S}$) between an equalized output signal and an ideal signal of the false pattern included in the pair, (b) a second Euclidean distance ($E^2_{T,S}$) between the equalized output signal and an ideal signal of the true pattern included in the pair, (c) a difference between the first Euclidean distance and the second Euclidean distance, (d) an average ($\mu$) and a standard deviation ($\sigma$) of a distribution of the difference, wherein the detected data is evaluated based on an estimated bit error rate bER=$\Sigma C_T \cdot F(0) \cdot H_{T,F}$ where $C_T$ denotes a probability of occurrence of a true pattern T, $H_{T,F}$ denotes Hamming distance between the true pattern T and a false pattern F, and F(0) denotes a probability of occurrence by mistaken identification from the pattern T to the pattern F and is defined as:

$$F(0) = \int_{-\infty}^{0} \frac{\exp\{-(x-\mu)^2/2\sigma^2\}}{\sigma\sqrt{2\pi}} dx.$$

4. An information recording medium in which an estimated bit error rate bER is smaller than $5 \times 10^{-5}$, the estimated bit error rate bER is represented by $\Sigma C_T \cdot F(0) \cdot H_{T,F}$ where $C_T$ denotes a probability of occurrence of a true pattern, F(0) denotes a probability of occurrence by mistaken identification from a true pattern to a false pattern and is defined as $$F(0) = \int_{-\infty}^{0} \frac{\exp\{-(x-\mu)^2/2\sigma^2\}}{\sigma\sqrt{2\pi}} dx$$

$\mu$ denotes an average of a distribution of a difference between a first Euclidean distance $E^2_{F,S}$ between an equalized output signal and an ideal signal of a false pattern included in one of predetermined pairs of a true pattern and a false pattern, in the one of predetermined pairs one of the true pattern and the false pattern coincides with data detected from the medium and a second Euclidean distance $E^2_{T,S}$ between the equalized output signal and an ideal signal of a true pattern included in the one of predetermined pairs, $\sigma$ denotes a standard deviation of the distribution of the difference between the first Euclidean distance and the second Euclidean distance, and $H_{T,F}$ denotes Hamming distance between a true pattern and a false pattern.

5. An information recording medium in which an estimated bit error rate bER is smaller than $5 \times 10^{-5}$, the estimated bit error rate bER is represented by $\Sigma C_T \cdot F(0) \cdot H_{T,F}$ where $C_T$ denotes a probability of occurrence of a true pattern, F(0) denotes a probability of occurrence by mistaken identification from a true pattern to a false pattern and is defined as $$F(0) = \int_{-\infty}^{0} \frac{\exp\{-(x-\mu)^2/2\sigma^2\}}{\sigma\sqrt{2\pi}} dx$$

$\mu$ denotes an average of a distribution of a difference between a first Euclidean distance $E^2_{F,S}$ between an equalized output signal and an ideal signal of a false pattern included in one of predetermined pairs of a true pattern and a false pattern, in the one of predetermined pairs one of the true pattern and the false pattern coincides with recording data a second Euclidean distance $E^2_{T,S}$ the equalized output signal and an ideal signal of a true pattern included in the one of predetermined pairs, $\sigma$ denotes a standard deviation of the distribution of the difference between the first Euclidean distance and the second Euclidean distance, and $H_{T,F}$ denotes Hamming distance between a true pattern and a false pattern.

* * * * *